US012444850B2

United States Patent
(12) United States Patent
Kum et al.

(10) Patent No.: US 12,444,850 B2
(45) Date of Patent: Oct. 14, 2025

(54) ANTENNA MODULE COMPRISING FEEDING UNIT PATTERN AND BASE STATION COMPRISING SAME

(71) Applicant: SAMSUNG ELECTRONICS CO., LTD., Suwon-si (KR)

(72) Inventors: Junsig Kum, Suwon-si (KR); Yoongeon Kim, Suwon-si (KR); Seungho Choi, Suwon-si (KR); Youngju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 18/074,178

(22) Filed: Dec. 2, 2022

(65) Prior Publication Data

US 2023/0102990 A1 Mar. 30, 2023

Related U.S. Application Data

(63) Continuation of application No. PCT/KR2021/005789, filed on May 10, 2021.

(30) Foreign Application Priority Data

Jun. 3, 2020 (KR) ........................ 10-2020-0066842

(51) Int. Cl.
*H01Q 15/00* (2006.01)
*H01Q 1/24* (2006.01)

(52) U.S. Cl.
CPC ......... *H01Q 15/0013* (2013.01); *H01Q 1/246* (2013.01)

(58) Field of Classification Search
CPC .. H01Q 15/0013; H01Q 1/246; H01Q 9/0414; H01Q 9/0457; H01Q 1/46
See application file for complete search history.

(56) References Cited

U.S. PATENT DOCUMENTS 4,477,813 A * 10/1984 Weiss .................. H01Q 21/065 343/700 MS
6,333,719 B1 * 12/2001 Varadan ............... H01Q 9/0407 333/161

(Continued)

FOREIGN PATENT DOCUMENTS

EP 3 883 140 A1 9/2021
JP 4366469 B2 11/2009

(Continued)

OTHER PUBLICATIONS

Communication dated Aug. 17, 2021, issued by the International Searching Authority in counterpart International Application No. PCT/KR2021/005789 (PCT/ISA/210).

(Continued)

*Primary Examiner* — Dimary S Lopez Cruz
*Assistant Examiner* — Austin M Back
(74) *Attorney, Agent, or Firm* — Sughrue Mion, PLLC

(57) ABSTRACT

An antenna module of a base station in a wireless communication system includes: a dielectric; a radiator disposed on a horizontal plane spaced apart from a first surface of the dielectric by a predetermined first length; a first feeding unit disposed on the first surface of the dielectric and providing an electrical signal to the radiator; and a second feeding unit disposed on the first surface of the dielectric, the second feeding unit being extending along a direction in which the electrical signal is provided by the first feeding unit to the radiator. The second feeding unit being connected to the first feeding unit. A second surface of the second feeding unit is spaced apart from a third surface of the radiator by a predetermined second length.

20 Claims, 19 Drawing Sheets

(56) References Cited

U.S. PATENT DOCUMENTS

| | | | |
|---|---|---|---|
| 9,590,314 B2 | 3/2017 | Celik | |
| 10,737,469 B2 | 8/2020 | Droste et al. | |
| 10,797,397 B2 | 10/2020 | Kim et al. | |
| 11,355,835 B2 | 6/2022 | Park et al. | |
| 2004/0150561 A1 | 8/2004 | Tillery et al. | |
| 2010/0097272 A1 | 4/2010 | Kim et al. | |
| 2011/0032164 A1* | 2/2011 | Villarroel | H01Q 9/285 343/700 MS |
| 2015/0288066 A1 | 10/2015 | Sonoda et al. | |
| 2017/0264012 A1 | 9/2017 | Clark et al. | |
| 2017/0365934 A1* | 12/2017 | Wilkins | H01Q 9/0421 |
| 2019/0036202 A1* | 1/2019 | Caratelli | H01Q 1/246 |
| 2019/0115664 A1* | 4/2019 | Veihl | H01Q 5/50 |
| 2019/0341693 A1* | 11/2019 | Haziza | H01P 11/00 |
| 2021/0066791 A1 | 3/2021 | Park et al. | |
| 2021/0313703 A1* | 10/2021 | Stanley | H01Q 21/0006 |

FOREIGN PATENT DOCUMENTS

| | | | |
|---|---|---|---|
| JP | 4905231 | B2 | 3/2012 |
| KR | 10-2008-0078149 | A | 8/2008 |
| KR | 10-1855133 | B1 | 5/2018 |
| KR | 10-2019-0086275 | A | 7/2019 |
| KR | 10-2019-0121661 | A | 10/2019 |
| KR | 10-2019-0131666 | A | 11/2019 |
| WO | 2007149046 | A1 | 12/2007 |
| WO | 2019139437 | A1 | 7/2019 |

OTHER PUBLICATIONS

Communication dated Aug. 17, 2021, issued by the International Searching Authority in counterpart International Application No. PCT/KR2021/005789 (PCT/ISA/237).

Communication dated Oct. 4, 2023 issued by the European Patent Office in European Application No. 21818606.2.

Communication dated Apr. 1, 2024, issued by the Korean Patent Office in Korean Application No. 10-2020-0066842.

Communication issued Sep. 13, 2024 by the Korean Intellectual Property Office in Korean Patent Application No. 10-2020-0066842.

Communication dated Apr. 30, 2025 issued by the European Patent Office in European Patent Application No. 21818606.2.

* cited by examiner

ANTENNA MODULE COMPRISING FEEDING UNIT PATTERN AND BASE STATION COMPRISING SAME

CROSS-REFERENCE TO RELATED APPLICATIONS

This application is a by-pass continuation application of International Application No. PCT/KR2021/005789, filed on May 10, 2021, which based on and claims priority to Korean Patent Application No. 10-2020-0066842, filed on Jun. 3, 2020, in the Korean Intellectual Property Office, the disclosures of which are incorporated by reference herein in their entireties.

BACKGROUND

Field

The present disclosure relates to an antenna module used in next-generation communication technology, and a base station comprising the antenna module.

Description of Related Art

Efforts are being made to develop an improved Fifth Generation (5G) communication system or a pre-5G communication system in order to meet the increasing demand for wireless data traffic after the commercialization of a Fourth Generation (4G) communication system. For this reason, the 5G communication system or the pre-5G communication system is called a communication system after the 4G network (Beyond 4G Network) or system after Long Term Evolution (LTE) system (Post LTE). In order to achieve a high data rate, the 5G communication system is considered for implementation in a ultra-high frequency (e.g., millimeter wave (mmWave)) band (e.g., a 60 GHz band). In order to alleviate path loss of radio waves in the ultra-high frequency band and to increase the transmission distance of radio waves in the 5G communication system, beamforming, massive Multiple-Input Multiple-Output (MIMO), Full Dimensional (FD) MIMO, array antenna, analog beamforming, and large scale antenna technologies have been discussed. In addition, in order to improve the network in the 5G communication system, technologies, such as evolved small cell, advanced small cell, cloud radio access network (RAN), ultra-dense network, Device to Device communication (D2D), wireless backhaul, moving network, cooperative communication, Coordinated Multi-Points (CMP), interference cancellation, have been developed. In addition, in 5G system, Advanced Coding Modulation (ACM) methods, such as Hybrid FSK and QAM Modulation (FQAM) and Sliding Window Superposition Coding (SWSC), advanced connection technologies such as Filter Bank Multi Carrier (FBMC), non-orthogonal multiple access (NOMA), and sparse code multiple access (SCMA), have been developed.

The internet has been evolving from a human-centered network in which humans generate and consume information to an Internet of Things (IoT) network that exchanges and processes information between distributed components such as objects. Internet of Everything (IoE) technology, which combines big-data processing technology through connection with cloud servers, etc. with IoT technology, has also been emerging. Technology elements, such as sensing technology, wired and wireless communication and network infrastructure, service interface technology, and security technology, are required to implement IoT. Recently, technologies such as sensor network, machine-to-machine (M2M), and machine type communication (MTC) for connection between objects have been studied. In an IoT environment, intelligent Internet Technology (IT) services that create new values in human life by collecting and analyzing data generated from connected objects may be provided. IoT may be applied to fields, such as smart home, smart building, smart city, smart car, or connected car, smart grid, health care, smart home appliance, and advanced medical service, through convergence and combination between existing Information Technology (IT) technologies and various industries.

Accordingly, various attempts are being made to apply the 5G communication system to the IoT network. For example, technologies, such as sensor network, M2M, and MTC have been implemented by 5G communication techniques, such as beamforming, MIMO, and array antenna. The application of cloud wireless access network (e.g., cloud RAN), as a big data processing technology described above, may be an example of the convergence of 5G technology and IoT technology. A next-generation communication system may use the ultra-high frequency band (e.g., mmWave), and an antenna module structure that enables smooth communication in the ultra-high frequency band is required.

An object of this disclosure is to provide a method and a device for implementing an antenna module that may simplify a manufacturing process and for reducing manufacturing cost while maintaining high efficiency or gain in a next-generation communication system.

SUMMARY

According to an aspect of the disclosure, an antenna module of a base station in a wireless communication system includes: a dielectric; a radiator disposed on a horizontal plane spaced apart from a first surface of the dielectric by a predetermined first length; a first feeding unit disposed on the first surface of the dielectric and providing an electrical signal to the radiator; and a second feeding unit disposed on the first surface of the dielectric, the second feeding unit being extending along a direction in which the electrical signal is provided by the first feeding unit to the radiator. The second feeding unit being connected to the first feeding unit. A second surface of the second feeding unit is spaced apart from a third surface of the radiator by a predetermined second length.

According to another aspect of the disclosure, a base station in a wireless communication system includes: one or more transmitters; one or more receivers; and an antenna module associated with the one or more transmitters and the one or more receivers. The antenna module includes: a dielectric; a radiator disposed on a horizontal plane spaced apart from a first surface of the dielectric by a predetermined first length; a first feeding unit disposed on the first surface of the dielectric and providing an electrical signal to the radiator; and a second feeding unit disposed on the first surface of the dielectric. The second feeding unit is extending along a direction in which the electrical signal is provided by the first feeding unit to the radiator and is connected to the first feeding unit. A second surface of the second feeding unit is spaced apart from a third surface of the radiator by a predetermined second length.

According to another aspect of the disclosure, a method of manufacturing an antenna module in a wireless communication system, includes: providing a dielectric; providing a radiator disposed on a horizontal plane spaced apart from a first surface of the dielectric by a predetermined first length; providing a first feeding unit on the first surface of the dielectric to supply an electrical signal to the radiator; providing a second feeding unit on the first surface of the dielectric; connecting the second feeding unit to the first feeding unit by extending the second feeding unit along a direction in which the electrical signal is supplied by the first feeding unit to the radiator; and placing the second feeding unit so as to dispose a second surface of the second feeding unit apart from a third surface of the radiator by a predetermined second length.

According to an embodiment of the present disclosure, an antenna of the same performance can be implemented without going through a complicated manufacturing process, and there is an effect can reduce manufacturing cost.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
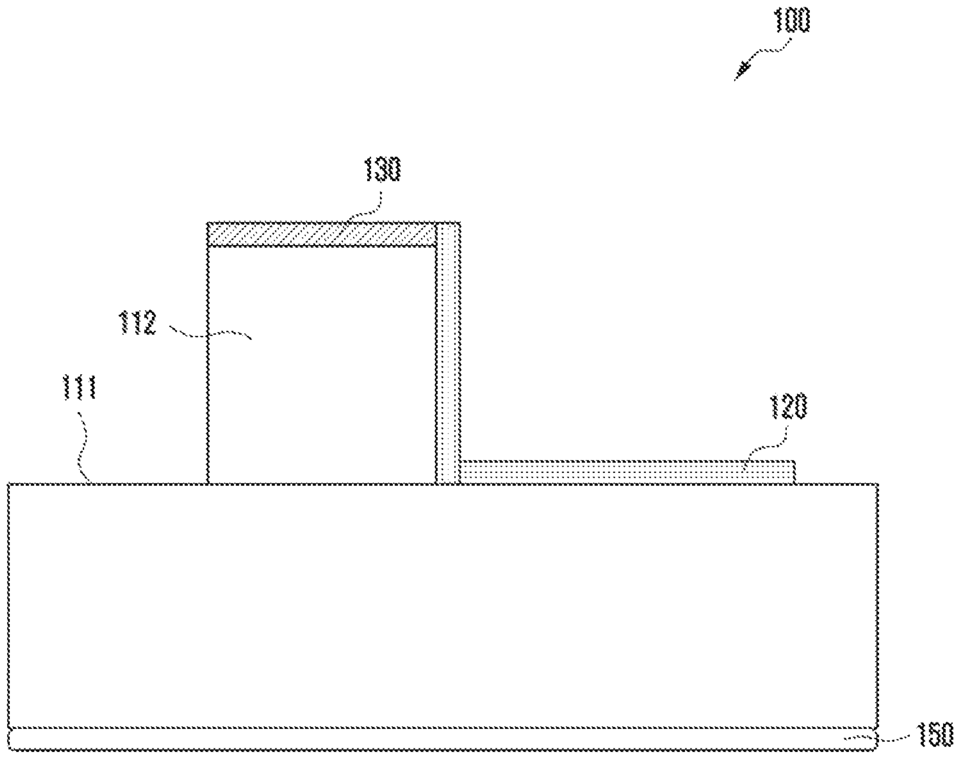
FIG. 1 illustrates a side surface of an antenna module according to an embodiment of the present disclosure.

In describing an embodiment of the present disclosure, a description of technical contents that is well known in the technical field to which the present disclosure belongs and are not directly related to the present disclosure will be omitted. This is to convey the gist of the present disclosure more clearly without blurring by omitting an unnecessary description.

For the same reason, some components are exaggerated, omitted, or schematically illustrated in the accompanying drawings. In addition, the size of each component does not fully reflect the actual size. The same reference number was assigned to the same or corresponding components in each drawing.

An advantage and a feature of the present disclosure and a method for achieving them will become apparent with reference to embodiments described below in detail together with the accompanying drawings. However, the present disclosure is not limited to the embodiments disclosed below, but may be implemented in various forms, only the present embodiments are provided so that the disclosure of the present disclosure is complete, and to fully inform those of ordinary skill in the art to which the present disclosure belongs to the scope of the disclosure, and the present disclosure is only defined by the scope of the claims. The same reference numerals refer to the same components throughout the disclosure.

In this case, it will be understood that each block of processing flowchart drawings and combinations of flowchart drawings may be performed by computer program instructions. Since these computer program instructions may be mounted on a processor of a general-purpose computer, a special purpose computer, or other programmable data processing equipment, the instructions performed through the processor of the computer or other programmable data processing equipment create a mean to perform the functions described in the flowchart block(s). Since these computer program instructions is also possible to be stored in a computer-usable or computer-readable memory that may aim a computer or other programmable data processing equipment to implement a function in a particular method, the instructions stored in the computer-usable or computer-readable memory is also possible to produce manufactured items including instruction means that perform functions described in the flowchart block(s). Since the computer program instructions is also possible to be mounted on a computer or other programmable data processing equipment, instructions for performing a computer or other programmable data processing equipment by performing a series of operational steps on a computer or other programmable data processing equipment and creating a computer-executed process may be possible to provide steps to execute the functions described in the flowchart block(s).

In addition, each block may represent a module, segment, or a part of code including one or more executable instructions for executing a specific logical function(s). It should also be noted that, in some alternative implementation examples, it is possible for the functions mentioned in the blocks to occur out of order. For example, it is possible that two blocks illustrated in succession are actually performed substantially simultaneously, or that the blocks are sometimes performed in reverse order according to the corresponding function.

In this case, the term '~part' used in the present embodiment refers to software or hardware components such as FPGA or ASIC, and the '~part' performs certain roles. However, the '~part' is not limited to software or hardware. The '~part' may be configured to be in an addressable storage medium or may be configured to play one or more processors. Thus, as an example, the '~part' comprises software components, object-oriented software components, components such as class components and task components, processes, functions, attributes, procedures, subroutines, segments of program code, drivers, firmware, microcode, circuits, data, database, data structures, tables, arrays, and variables. The functions provided in components and '~part's may be combined into a smaller number of components and '~part's or further separated into additional components and '~part's. In addition, the components and the '~part's may be implemented to play one or more CPUs in the device or secure multimedia card. In addition, in an embodiment, the '~part' may include one or more processors.

Hereinafter, an antenna module structure disclosed in this disclosure is a structure applicable to a next-generation communication system, and is applicable to, for example, a communication system having an operating frequency of 6 GHz or less.

FIG. 1 illustrates a side surface of an antenna module according to an embodiment of the present disclosure. Referring to FIG. 1, an antenna module 100 according to an embodiment may include a dielectric 111, a protrusion 112, a radiator 130, a first feeding unit 120, and a ground layer 150.

In one embodiment, the dielectric 111 may have a plate shape, and a protrusion 112 for disposing the radiator 130 may be formed on a (top) surface of the dielectric 111. The protrusion 112 may be formed integrally with the dielectric 111 or may be formed separately from the dielectric 111. In one embodiment, the dielectric may be replaced with a non-metallic material excluding the dielectric.

In one embodiment, the radiator 130 (radiating a radio frequency (RF) signal to the outside) may be disposed on a (top) surface of the protrusion 112 formed from the dielectric 111. In addition, in one embodiment, the first feeding unit 120 (supplying an electrical signal corresponding to the RF signal to the radiator 130) may be disposed on the top surface of the dielectric 111. The first feeding unit 120 may supply an electrical signal to the radiator 130 using, for example, a feeding line formed along the side surface of the protrusion 112 as illustrated in FIG. 1.

In addition, in one embodiment, the antenna module 100 may include a ground layer 150 of a metal plate disposed on the lower end of the dielectric 111. FIG. 1 illustrates the structure of the antenna module simply. In one embodiment, the antenna module may further include a radio communication chip or a printed circuit board (PCB) disposed on the lower end of the ground layer or the lower end of the dielectric to transmit an RF signal for operating the radiator as an antenna to the feeding unit.

Figure 2:
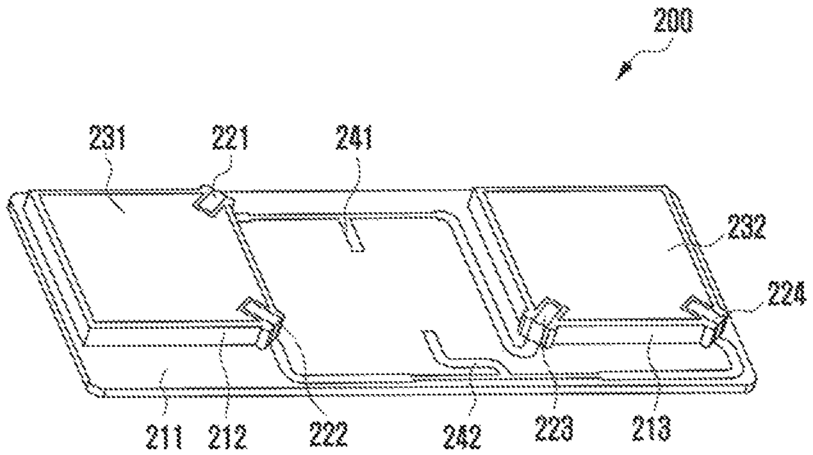
FIG. 2 illustrates a structure of an antenna module according to an embodiment of the present disclosure.

FIG. 2 illustrates a structure of an antenna module according to an embodiment of the present disclosure. FIG. 2 illustrates a case in which the antenna module 200 having the structure of FIG. 1 includes two radiators 231 and 232. Referring to FIG. 2, in one embodiment, the antenna module 200 may include a dielectric 211, protrusions 212 and 213, which are formed to protrude by a predetermined length from the top surface of the dielectric 211, and the radiators 231 and 232 disposed on each surface of the protrusions 212 and 213.

In addition, in one embodiment, the antenna module 200 may include a second feeding unit 221, a third feeding unit 222, a fourth feeding unit 223, and a fifth feeding unit 224 configured to supply RF signals to each of the radiators 231 and 232. The antenna module 200 may include distributors 241 and 242 configured to distribute RF signals directed to the second feeding unit 221, the third feeding unit 222, the fourth feeding unit 223, and the fifth feeding unit 224. In FIG. 2, in one embodiment, the second feeding unit 221, the third feeding unit 222, the fourth feeding unit 223, and the fifth feeding unit 224 may supply RF signals toward different radiators through distributors 241 and 242 disposed on the surface of the dielectric 211.

In one embodiment, the second feeding unit 221 and the fourth feeding unit 223 may supply RF signals related to horizontal polarization to the radiators 231 and 232. In one embodiment, the third feeding unit 222 and the fifth feeding unit 224 supplies RF signals related to vertical polarization to the radiators 231 and 232. In one embodiment, a direction in which the second feeding unit 221 and the fourth feeding unit 223 that supply RF signals related to horizontal polarization extend toward the radiators 231 and 232 is disposed to be orthogonal to another direction in which the third feeding unit 222 and the fifth feeding unit 224 that supply RF signals related to vertical polarization extend toward the radiators 231 and 232, so that the gain values of horizontal polarization and vertical polarization radiated through the radiators 231 and 232 may be improved.

In addition, in one embodiment, the second feeding unit 221, the third feeding unit 222, the fourth feeding unit 223, and the fifth feeding unit 224 may be formed to extend from the (top) surface of the dielectric 211 to the (top) surface of the protrusions 212 and 213 through the side surfaces of the protrusions 212 and 213. In one embodiment, the feeding units may have a gap-coupled structure close to the radiators 231 and 232 within a predetermined distance as the feeding units are formed to extend from the (top) surface of the dielectric to the (top) surface of the protrusion. In this way, in case of power feeding based on the gap-coupled method that is close within a predetermined distance, the bandwidth of the radio wave radiated through the radiator may be improved.

The above-described examples of FIGS. 1 and 2 may relate to an antenna structure of a general Antenna Filter Unit (AFU), and such a feeding unit pattern may be formed using a metal device or a PCB substrate.

Figure 3:
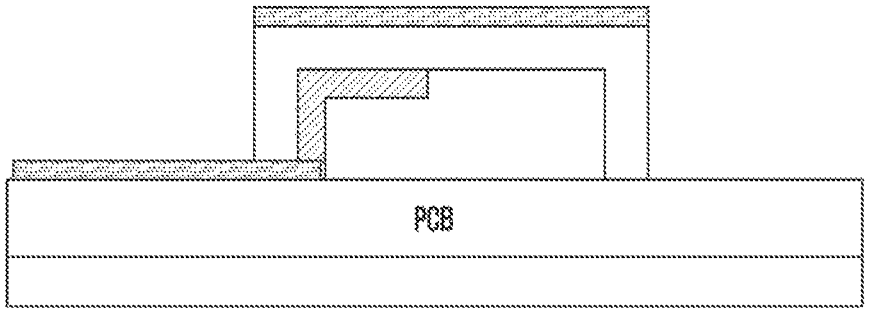
FIG. 3 illustrates an example for implementing a feeding unit pattern according to the present disclosure.
Figure 4:
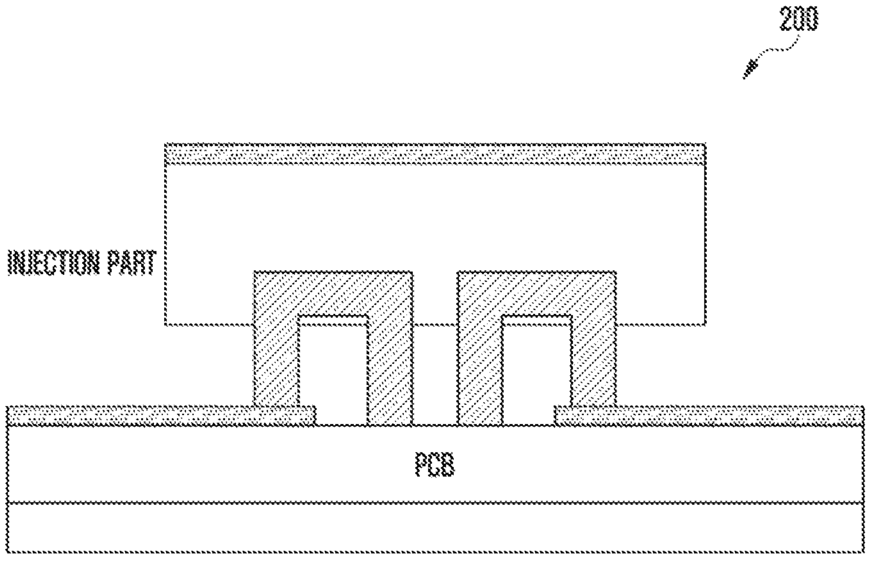
FIG. 4 illustrates another example for implementing a feeding unit pattern according to the present disclosure.

FIG. 3 illustrates an example for implementing a feeding unit pattern according to the present disclosure, and FIG. 4 illustrates another example for implementing the feeding unit pattern according to the present disclosure.

In one embodiment, in a feeding unit such as the feeding units illustrated in FIGS. 1 and 2, antenna performance may be implemented using a PCB substrate and an injection molding device. For example, the feeding unit may be formed by printing on the injected dielectric or may be separately pressed and coupled to the injected dielectric. For example, the feeding unit may be implemented as a PCB substrate as illustrated in FIG. 3 or as an injection molded product from the PCB substrate as illustrated in FIG. 4.

As in the above-described examples, in a case that the feeding unit for antenna performance is implemented, injection molding is required in a manufacturing process, but in a case that the antenna module is implemented as described above, the implementation method may be difficult and manufacturing costs may be high.

Therefore, the present disclosure proposes a structure of the antenna module that may be implemented to have the same antenna performance without increasing manufacturing costs and going through a complicated manufacturing process.

Figure 5:
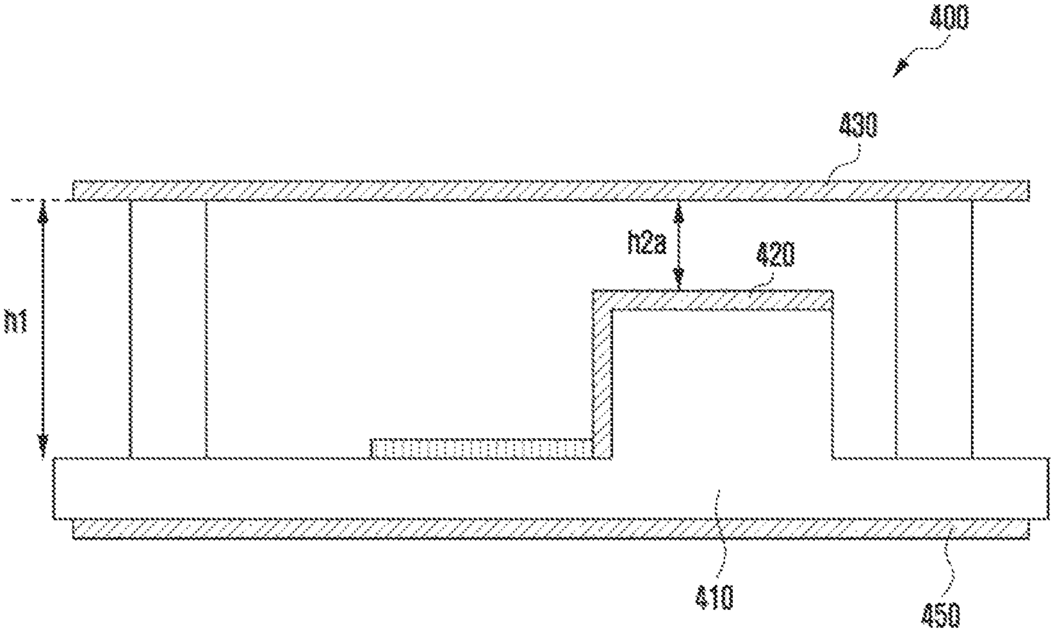
FIG. 5 illustrates a structure of an antenna module viewed from a side surface in relevant art.
Figure 6:
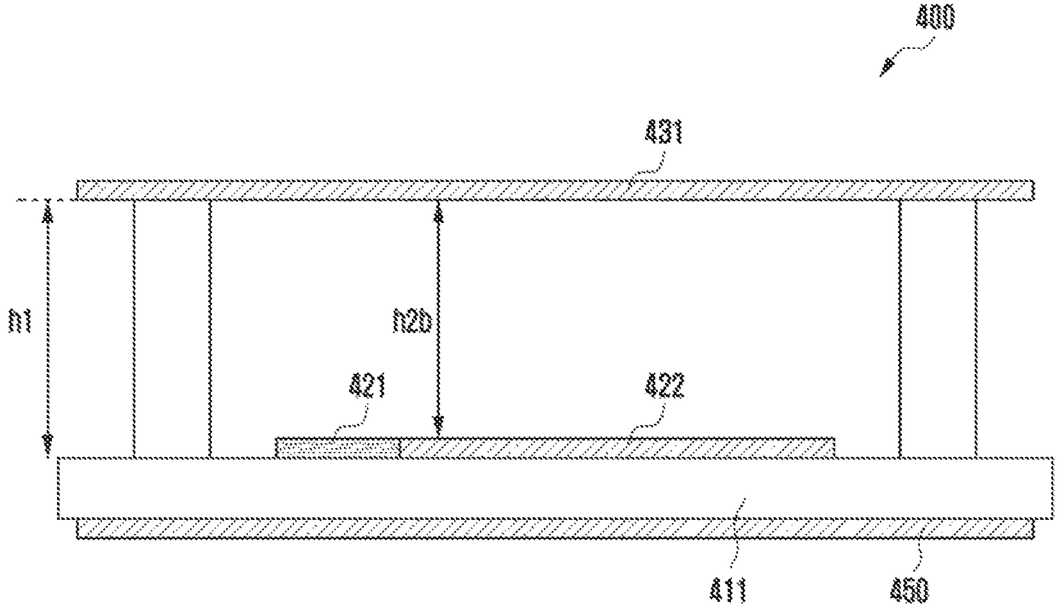
FIG. 6 illustrates a structure of an antenna module viewed from a side surface, according to an embodiment of the present disclosure.
Figure 7:
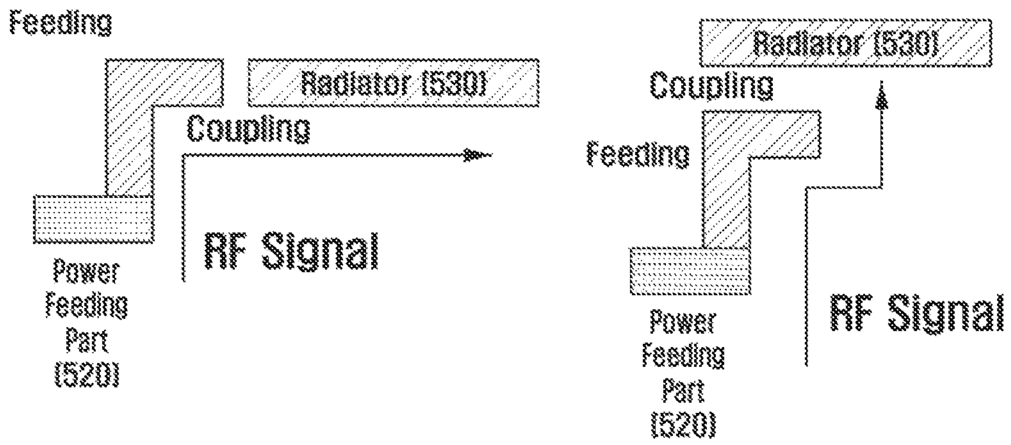
FIG. 7 illustrates a Radio Frequency (RF) signal transmission process in an antenna module in relevant art.
Figure 8:
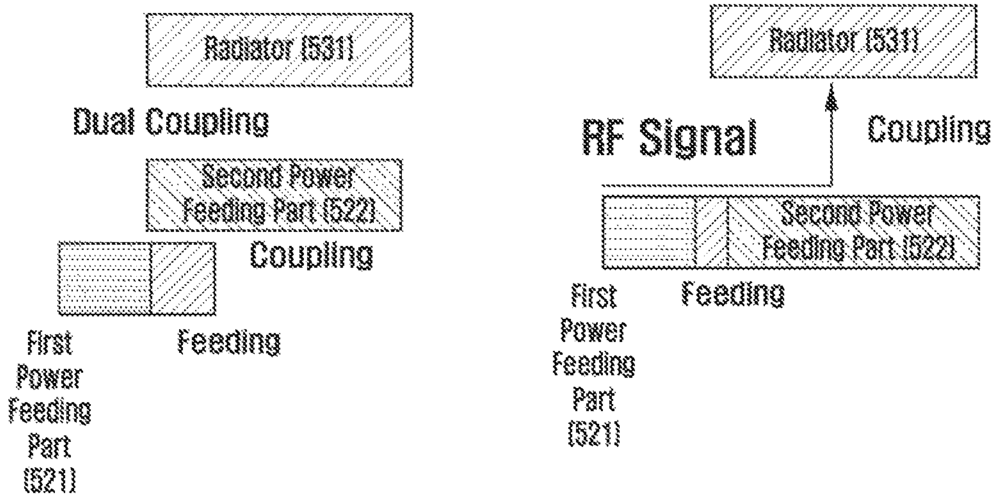
FIG. 8 illustrates an RF signal transmission process in an antenna module, according to an embodiment of the present disclosure.

FIG. 5 illustrates a structure of an antenna module viewed from a side surface in relevant art, and FIG. 6 illustrates a structure of an antenna module viewed from a side surface, according to an embodiment of the present disclosure. FIG. 7 illustrates an RF signal transmission process in the antenna module in relevant art, and FIG. 8 illustrates an RF signal transmission process in an antenna module according to an embodiment of the present disclosure.

Figure 9:
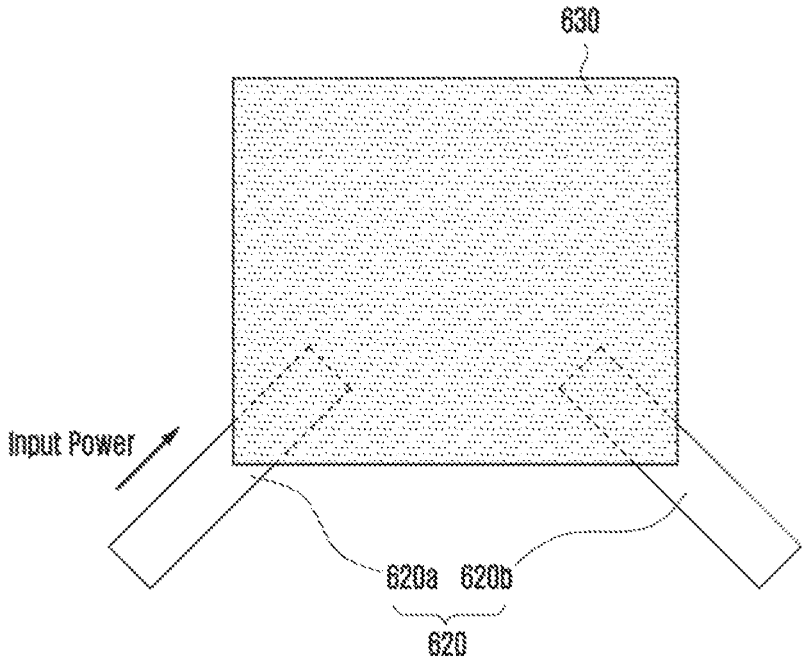
FIG. 9 illustrates a structure of an antenna module viewed from top in relevant art.
Figure 10:
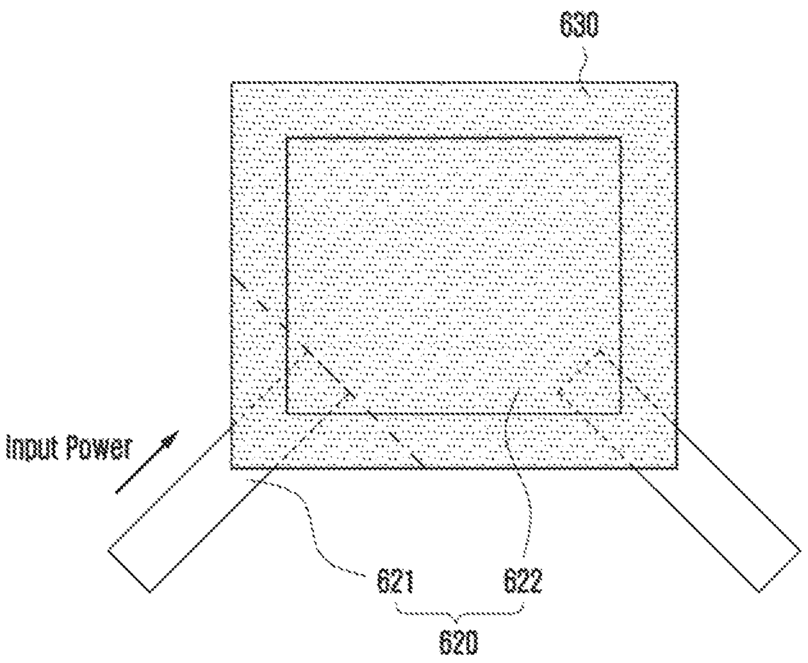
FIG. 10 illustrates a structure of an antenna module viewed from top, according to an embodiment of the present disclosure.

In addition, FIG. 9 illustrates a structure of an antenna module viewed from top in relevant art, and FIG. 10 illustrates a structure of an antenna module viewed from the top, according to an embodiment of the present disclosure.

FIG. 5 illustrates a structure of the antenna module implemented in a general AFU of the relevant art. Descriptions of parts overlapping with those described above with respect to the functions of each component configuring the antenna module will be omitted.

More specifically, referring to FIG. 5, the antenna module 400 in relevant art may include a ground layer 450, a dielectric 410, a sixth feeding unit 420, and a radiator 430. As illustrated, the ground layer 450 has a plate shape, and the dielectric 410 may include a protrusion protruding to a predetermined height on a top surface based on the plate shape. In addition, the radiator 430 may be disposed on a horizontal plane spaced apart from the top surface of the dielectric 410 by a first length h1. In FIG. 5, the horizontal plane on which the radiator 430 is disposed may be defined by a protrusion having a top surface spaced apart from the top surface of the dielectric 410 by a first length.

In addition, the sixth feeding unit 420 may be formed to extend from the top surface of the dielectric 410 to the top surface of the protrusion along the side surface of the protrusion protruding from the top surface of the dielectric 410 by a predetermined height. At this time, the sixth feeding unit 420 disposed on the top surface of the protrusion is disposed such that the top surface is spaced apart from the lower surface of the radiator 430 by a second length h2*a*, thereby forming a gap-coupled structure with the radiator 430.

FIG. 6 illustrates a seventh feeding unit 421 and an eighth feeding unit 422 disposed in a plate shape on a top surface of a dielectric 411, according to an embodiment of the present disclosure. More specifically, the dielectric 411 and a ground layer 450 may be disposed in a plate shape, and the radiator 431 may be disposed on a horizontal plane spaced apart from the top surface of the dielectric 411 by a first length h1.

In FIG. 6, in one embodiment, the horizontal plane on which the radiator 431 is disposed is illustrated to be defined by a protrusion protruding from the dielectric 411. Alternatively, the horizontal plane may be defined by a separate layer located on the upper part of the dielectric 411 and spaced apart by the first length (h1) from the top surface of the dielectric 411. In this case, the radiator 431 may be disposed on the top surface or the lower surface of the separate layer.

In addition, in one embodiment, the seventh feeding unit 421 and the eighth feeding unit 422 may be disposed in a plate shape on the top surface of the dielectric 411. More specifically, in one embodiment, the seventh feeding unit 421 is disposed on the top surface of the dielectric 411 and provides an electrical signal for supplying the radiator 431. The eighth feeding unit 422 is disposed to be connected the seventh feeding unit 421 on the top surface of the dielectric 411 and provides an electrical signal input from the seventh feeding unit 421 to the radiator 431. In this case, the eighth feeding unit 422 may have a plate shape extending along a direction in which an electrical signal is input from the seventh feeding unit 421.

In addition, in one embodiment, the eighth feeding unit 422 may be disposed such that the top surface of the eighth feeding unit 422 is spaced apart from the lower surface of the radiator 431 by the second length (h2*b*). Here, the eighth feeding unit 422 does not extend or protrude in a direction perpendicular to the top surface of the dielectric 411 and is disposed in a plate shape on the top surface of the dielectric 411 (unlike the sixth feeding unit 420 illustrated in FIG. 5). The second length (h2*b*) (in which the top surface of the eighth feeding unit 422 and the lower surface of the radiator 431 are spaced apart) is longer than the length "h2*a*" illustrated in FIG. 5 (in which the top surface of the sixth feeding unit 420 and the lower surface of the radiator 430 are spaced apart).

For example, in a case of implementing the eighth feeding unit 422 as illustrated in FIG. 6, in order to secure the same antenna performance as in relevant art, the above-described second length (h2*b*) may be defined as a maximum of λo/5. Here, λo refers to a wavelength in air (λo=c/f, c: 3×108 m/s, f: frequency).

In this way, unlike the feeding unit of the relevant art, which has to go through a complicated manufacturing process to secure the radiation distance according to the gap-coupled structure, the feeding units of the present disclosure (such as the seventh feeding unit 421 and the eighth feeding unit 422) are disposed in a plate shape on the top surface of the dielectric. Thus, there is an effect of simplification of the manufacturing process and reduction of manufacturing cost.

In addition, in one embodiment, since the feeding units of the present disclosure are disposed in a shape different from that of the relevant art, a coupling method for transmitting the RF signal to the radiator is changed. More specifically, referring to FIG. 7, in the antenna module of the relevant art, the feeding region of a power feeding part (a ninth feeding unit) 520 is formed up to a part protruding by a predetermined height from the top surface of the dielectric, and transmits an RF signal within a specific distance from the radiator 530. For example, as illustrated in the left drawing of FIG. 7, the feeding region of the power feeding part (the ninth feeding unit) 520 may be formed up to a height at which the radiator 530 is disposed to transmit an RF signal through horizontal coupling on the same plane as the radiator 530. Or, as illustrated in the right drawing of FIG. 7, the feeding region of the power feeding part (the ninth feeding unit) 520 may be formed up to a height lower than the radiator 530 by a predetermined length to transmit an RF signal through vertical coupling with the radiator 530.

In contrast, referring to FIG. 8, in one embodiment of the present disclosure, a second power feeding part (an eleventh feeding unit) 522 receiving the electrical signal from a first power feeding part (a tenth feeding unit) 521 transmits the RF signal to the radiator at a position spaced apart from the radiator by a predetermined distance or more.

For example, as illustrated in the left drawing of FIG. 8, the second power feeding part (the eleventh feeding unit) 522 may form a coupling through a structure vertically overlapping with the feeding region of the first power feeding part (the tenth feeding unit) 521, and then transmit the received RF signal to the radiator 531. In this case, the second power feeding part (the eleventh feeding unit) 522 transmits the RF signal in a dual coupling method through coupling with the feeding region of the first power feeding part (the tenth feeding unit) 521 and coupling with the radiator 531.

As another example, as illustrated in the right drawing of FIG. 8, the second power feeding part (the eleventh feeding unit) 522 may directly receive the RF signal on the same plane as the feeding region of the first power feeding part (the tenth feeding unit) 521, and may transmit the RF signal through coupling with the radiator 531. In this case, unlike the antenna module of the relevant art, the second power feeding part (the eleventh feeding unit) 522 may transmit an RF signal through a coupling by the entire area even if it is not located within a specific distance from the radiator 531.

In other words, since the second power feeding part (the eleventh feeding unit) 522 performing the coupling through the entire area serves as a kind of a radiator according to the structure of the antenna module, there is an advantage in that it is not necessary to take a structure in which the feeding region is protruded to be located within a specific distance from the radiator for RF signal transmission.

On the other hand, in one embodiment, the antenna module may implement a disposition structure in which an input electrical signal may be effectively transmitted to the radiator 531 in order to implement the same performance as that of an antenna of the relevant art, instead of securing a radiation distance as described above.

More specifically, in one embodiment, a difference in the disposition structure between the antenna module of the relevant art and the antenna module of the present disclosure will be described with reference to FIGS. 9 (the relevant art) and 10 (the present disclosure). FIGS. 9 and 10 illustrate the structure of the antenna module as viewed from the top.

Referring to FIG. 9, in relevant art, a twelfth feeding unit 620 may be formed to extend toward the radiator 630. In FIG. 9, the twelfth feeding unit 620 includes a first part **620*a* of the twelfth feeding unit 620 extending in a first direction and a second part 620*b* of the twelfth feeding unit 620 extending in a second direction orthogonal to the first direction. In FIG. 9, when viewed from the top, a partial region of the radiator 630 may be disposed to overlap one end of the first part 620*a* of the twelfth feeding unit 620 extending in the first direction and one end of the second part 620*b* of the twelfth feeding unit 620 extending in the second direction. In this case, the radiator 630 receives an RF signal that may operate as an antenna from a field formed by a first electrical signal input to one end of the first part 620*a* of the twelfth feeding unit 620 extending in the first direction and a second electrical signal input to one end of the second part 620*b* of the twelfth feeding unit 620** extending in the second direction.

In contrast, referring to FIG. 10, in one embodiment, the twelfth feeding unit 620 may be configured to a third part 621 (that provides electrical signals in the first direction and the second direction respectively toward the radiator) and a fourth part 622 (that transmits electrical signals input from the third part 621 of the twelfth feeding unit 620 to the radiator 630). According to the example illustrated in FIG. 8, one end of the third part 621 of the twelfth feeding unit 620 connected to the fourth part 622 of the twelfth feeding unit 620 and at least a part of the fourth part 622 of the twelfth feeding unit 620 may be disposed to overlap with the radiator 630. In one embodiment, the first electrical signal input to the fourth part 622 of the twelfth feeding unit 620 in the first direction and the second electrical signal input to the second power feeding part (the eleventh feeding unit) 522 in the second direction may be transmitted to the radiator 630 through one end of the first power feeding part (the tenth feeding unit) 521 and the entire area of the fourth part 622 of the twelfth feeding unit 620.

In one embodiment, the antenna module has the effect of implementing the same performance as the antenna module of the relevant art through the disposition structure between the third part 621 of the twelfth feeding unit 620 and the fourth part 622 of the twelfth feeding unit 620, and the radiator 630 while realizing the reduction in manufacturing cost and the simplification of the manufacturing process.

Hereinafter, a structure of the feeding units according to the present disclosure capable of implementing the same antenna performance will be described in more detail.

Figure 11:
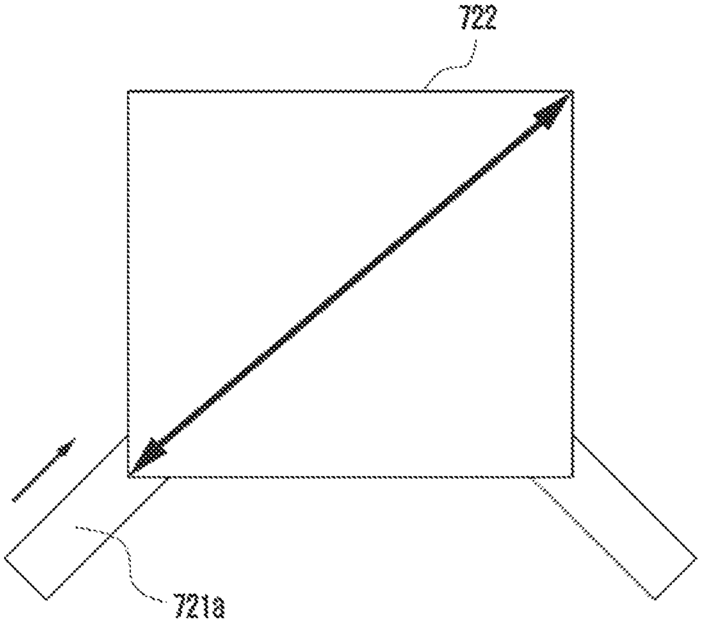
FIG. 11 illustrates an example in which a feeding unit and another feeding unit are connected according to an embodiment of the present disclosure.
Figure 12:
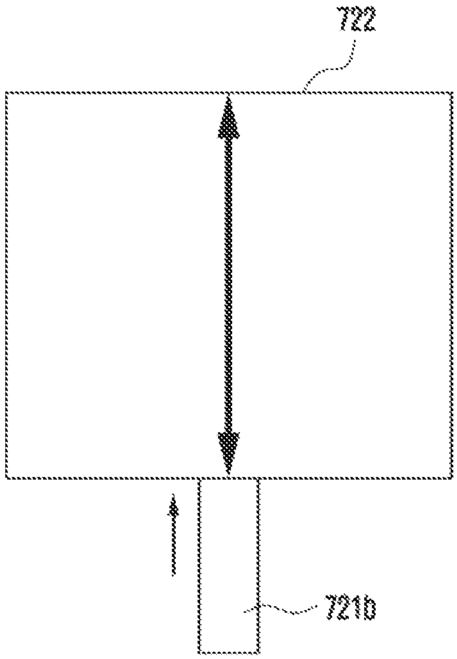
FIG. 12 illustrates another example in which a feeding unit and another feeding unit are connected according to an embodiment of the present disclosure.
Figure 13:
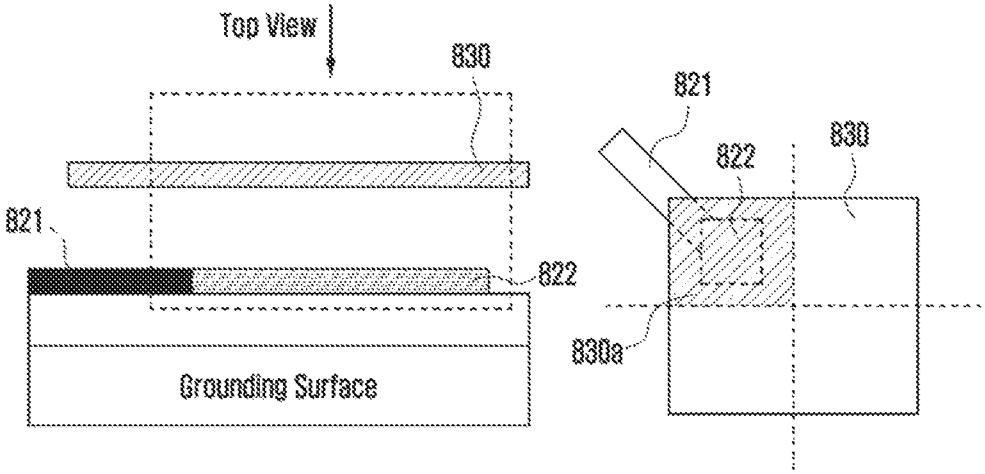
FIG. 13 illustrates an overlapping structure of a feeding unit and a radiator according to an embodiment of the present disclosure.

FIG. 11 illustrates an example in which feeding units are connected according to an embodiment of the present disclosure. FIG. 12 illustrates another example in which feeding units are connected according to an embodiment of the present disclosure. In addition, FIG. 13 illustrates an overlapping structure of a feeding unit and a radiator according to an embodiment of the present disclosure.

In one embodiment, a feeding unit may be formed to have a size greater than or equal to a predetermined size to effectively transmit an electrical signal to a radiator. Here, the size of the feeding unit may be defined based on a direction in which an electrical signal is input from another feeding unit.

More specifically, referring to FIG. 11, a thirteenth feeding unit **721*a* provides a first electrical signal related to vertical polarization to a fourteenth feeding unit 722 in a first direction, as in the example described above in FIG. 2, and may provide a second electrical signal related to the horizontal polarization to the fourteenth feeding unit 722 in the second direction. As another example, as illustrated in FIG. 10, a fifteenth feeding unit 721*b* may provide an electrical signal to the fourteenth feeding unit 722** in only one direction.

In the present disclosure, for convenience of explanation, the size of the fourteenth feeding unit 722 capable of transmitting an RF signal to the radiator will be defined based on one end of the fourteenth feeding unit 722 connected to the thirteenth feeding unit **721*a*, the direction in which the electrical signal is input, and the length by the other end of the fourteenth feeding unit 722** located in the opposite direction of the one end.

For example, in a case that the fourteenth feeding unit 722 is implemented in a rectangular shape, as illustrated in FIG. 11, the length corresponding to the diagonal line of the fourteenth feeding unit 722, and as illustrated in FIG. 12, the length corresponding to one side of the fourteenth feeding unit 722 may be defined as the size of the fourteenth feeding unit 722. The size of the fourteenth feeding unit 722 defined in this way needs to be determined to be greater than or equal to a preset value sufficient to effectively radiate an RF signal to the radiator.

The size of the fourteenth feeding unit 722 defined as described above needs to be determined to be greater than or equal to a predetermined value enough to effectively radiate the RF signal to the radiator. Here, the predetermined value may be determined, for example, by the permittivity of a dielectric on which the fourteenth feeding unit 722 is disposed. As a more specific example, when the relative permittivity of the substrate on which the fourteenth feeding unit 722 is disposed is $\varepsilon r$, the predetermined value may be determined as a value between (λo)/(4*√εr)~λo/√εr. For example, the predetermined value may be determined as (λo)/(2*√εr).

In one embodiment, the fourteenth feeding unit 722 needs to be disposed to partially overlap with the radiator so as to effectively radiate the input electrical signal to the radiator. More specifically, referring to FIG. 13, in one embodiment, the antenna module, as in the above-described examples, may include a plate-shaped grounding surface and a dielectric, and may have a structure in which a sixteenth feeding unit 821 and a seventeenth feeding unit 822 are disposed on the top surface of the dielectric. In addition, the radiator 830 may be disposed such that the lower surface of the radiator 830 and the top surface of the seventeenth feeding unit 822 are spaced apart by a predetermined length.

In this case, even if the radiator 830 and the seventeenth feeding unit 822 are disposed on different layers, at least a part of the area of the radiator 830 and the area of the seventeenth feeding unit 822 should overlap with respect to a direction perpendicular to each layer. Here, overlapping of the areas based on a direction perpendicular to each layer may mean that the seventeenth feeding unit 822 and the radiator 830 are disposed so that at least a part of the area of the seventeenth feeding unit 822 and the area of the radiator 830 overlaps in each layer when the layer on which the seventeenth feeding unit 822 is disposed and the layer on which the radiator 830 is disposed are viewed from top.

More specifically, a side surface of the antenna module is illustrated on the left side of FIG. 13, and a structure in which a dotted line part illustrated on the left side is viewed from the top is illustrated on the right side. In this case, for the structure of the feeding unit to implement the same performance as that of the antenna of the relevant art, as illustrated on the right side of FIG. 13, the area of the seventeenth feeding unit 822 should be disposed to overlap at least a part of the area of the radiator 830.

For example, based on a direction perpendicular to the horizontal plane on which the radiator 830 is disposed, a predetermined ratio or more of the area of the radiator 830 should be disposed to overlap with the area of the seventeenth feeding unit 822. For example, as illustrated on the right side of FIG. 7, in the case that the radiator 830 having a quadrangle shape is divided into quadrants, the seventeenth feeding unit 822 needs to overlap with an area **830*a*** corresponding to at least one of the divided quadrants.

Figure 14:
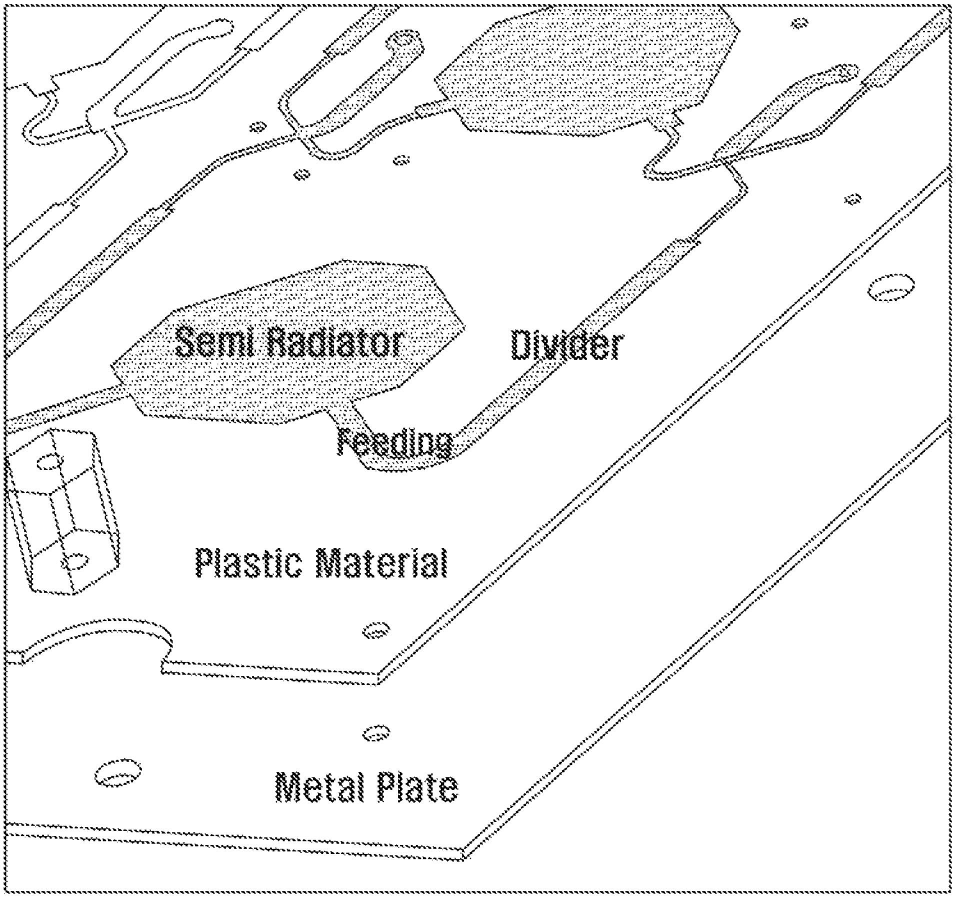
FIG. 14 illustrates an antenna module implemented by a first method according to an embodiment of the present disclosure.
Figure 15:
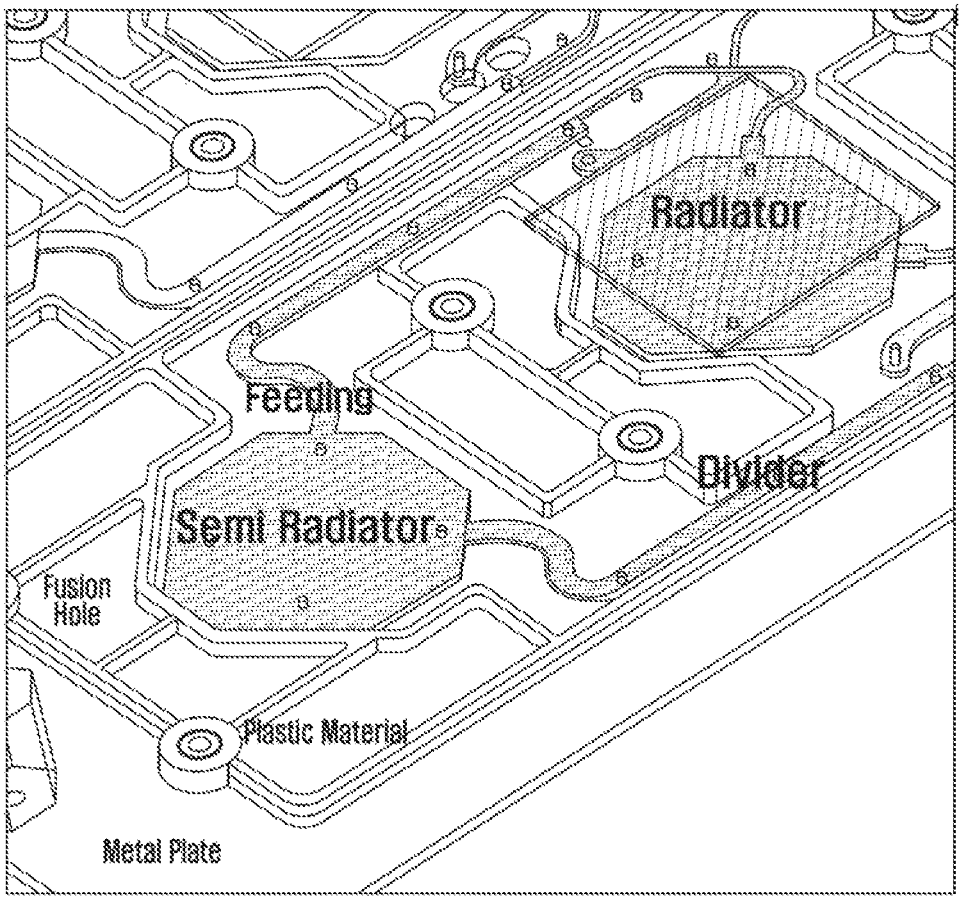
FIG. 15 illustrates an antenna module implemented by a second method according to an embodiment of the present disclosure.

FIG. 14 illustrates an antenna module implemented by a first method according to an embodiment of the present disclosure, and FIG. 15 illustrates an antenna module implemented by a second method according to an embodiment of the present disclosure. In FIGS. 14 and 15, in one embodiment, a feeding unit is illustrated as a divider and another feeding unit is illustrated as a semi-radiator.

In one embodiment, the antenna module may be implemented by a bonding sheet bonding method. For example, as illustrated in FIG. 14, in one embodiment, the antenna module may manufacture a ground by using a metal plate. For example, the ground may be implemented by using Laser Direct Structuring (LDS), a metal sheet, or a bonding sheet. In addition, in one embodiment, the antenna module may be manufactured by coupling the feeding unit pattern with a plastic on the plastic material using a bonding sheet and LDS.

In addition, as illustrated in FIG. 15, in one embodiment, the antenna module may be implemented by manufacturing a plastic material by injection molding, and then bonding a radiator and a metal divider by fusion. In addition to this, in one embodiment, the antenna module can be implemented by bonding to the metal plate that is a ground layer using the antenna screw.

In one embodiment, the antenna module may have a structure that further includes an air gap in the dielectric or the ground layer at a position overlapping the feeding unit pattern in order to secure antenna performance.

Figure 16:
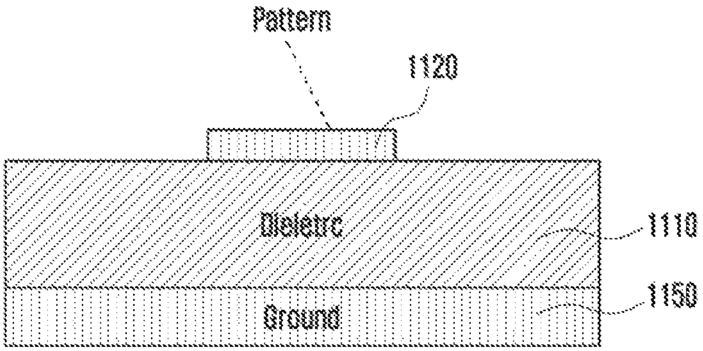
FIG. 16 illustrates a disposition structure of a ground layer and a dielectric in an antenna module according to an embodiment of the present disclosure.
Figure 17:
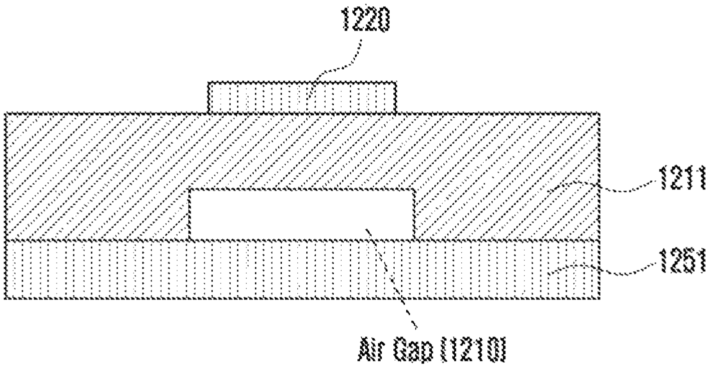
FIG. 17 illustrates a structure of a dielectric including a ground layer and an air gap in an antenna module according to an embodiment of the present disclosure.
Figure 18:
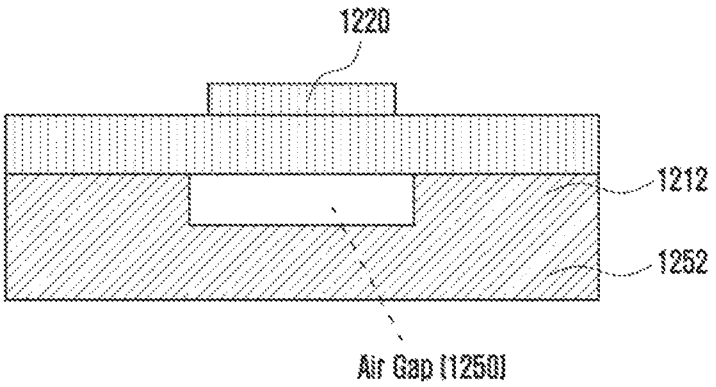
FIG. 18 illustrates a structure of a ground layer including a dielectric and an air gap in a module according to an embodiment of the present disclosure.
Figure 19:
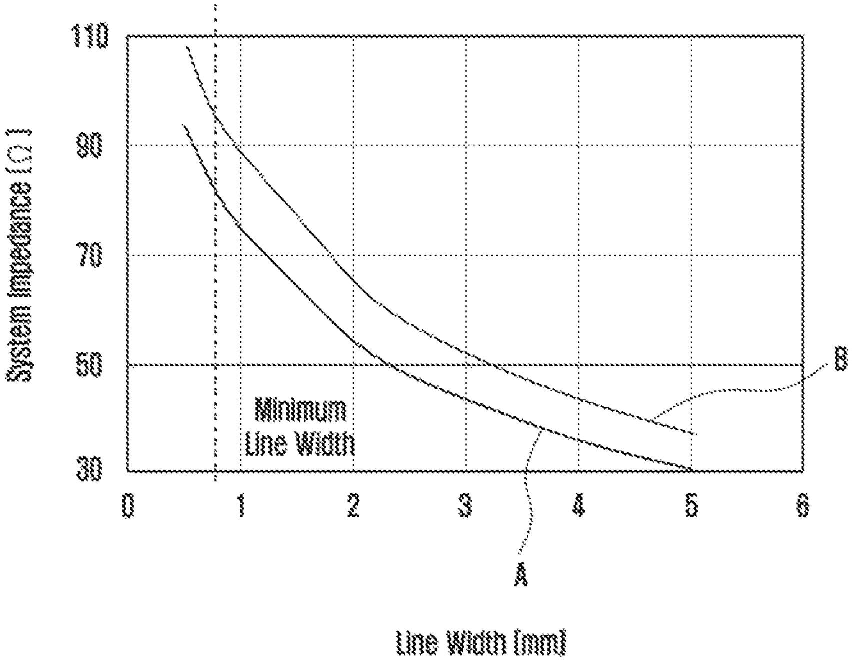
FIG. 19 is a diagram for illustrating antenna performance in a structure including an air gap according to an embodiment of the present disclosure.

FIG. 16 illustrates a disposition structure of a ground layer and a dielectric in an antenna module according to an embodiment. FIG. 17 illustrates a structure of the dielectric including a ground layer and an air gap in an antenna module according to an embodiment, and FIG. 18 illustrates a structure of a ground layer including the dielectric and an air gap in a module according to an embodiment. In addition, FIG. 19 illustrates antenna performance in a structure including an air gap, according to an embodiment of the present disclosure.

As illustrated in FIG. 16, in one embodiment, the antenna module may have the ground layer 1150 disposed in a plate shape, a dielectric 1110 having a plate shape on an upper part of the ground layer 1150, and a feeding unit pattern 1120 formed on a top surface of the dielectric 1110. However, in the present disclosure, an air gap may be provided in the dielectric or the ground layer to improve impedance matching performance for signal transmission in the RF band.

As an example, as illustrated in FIG. 17, in the antenna module of an embodiment, the ground layer 1251 and a dielectric 1211 may be respectively disposed in a plate shape, and the feeding unit pattern 1220 may be formed on the top surface of the dielectric 1211. In this case, in one embodiment, the dielectric 1211 may form or include a first air gap 1210 between the dielectric 1211 and the ground layer 1251 at a position substantially overlapping with the feeding unit pattern 1220. In addition, in contrast, as illustrated in FIG. 18, in one embodiment, the ground layer 1252 of the antenna module may form or include a second air gap 1250 between the ground layer 1252 of the antenna module and the dielectric 1212 at a position substantially overlapping with the feeding unit pattern 1220.

Since the available impedance of the signal line may be expanded in a case that the air gaps (such as the first air gap 1210 and the second air gap 1250) are formed or included as described above, it is advantageous for impedance matching to transmit a signal in the RF band, thereby improving the performance of the circuit and facilitating the implementation of the circuit. In addition, in one embodiment, as the air gap is formed, even with the same system impedance, the maximum current density of the signal line can be increased. Thus, this configuration has the effect of withstanding a high output signal.

More specifically, as illustrated in FIG. 19, in a case that the air gaps (such as the first air gap 1210 and the second air gap 1250) are formed or included as in the structure of FIG. 17 or FIG. 18, it may be seen that the system impedance increases with respect to the minimum line width. As described above, in one embodiment, by additionally implementing an air gap, there is an effect that the antenna performance may be further improved.

On the other hand, the embodiments of the present disclosure disclosed in the present disclosure and drawings are only presented as specific examples to easily explain the technical contents of the present disclosure and help the understanding of the present disclosure, and are not intended to limit the scope of the present disclosure. That is, it is apparent to those of ordinary skill in the art to which the present disclosure pertains that other modified example may be implemented based on the technical idea of the present disclosure. In addition, each of the above embodiments may be operated in combination with each other as needed. For example, some of the methods proposed in the present disclosure may be combined with each other to operate the base station and the terminal.

The present disclosure may be used in the electronics industry and the information and communication industry.

What is claimed is:

1. An antenna module comprising:
- a dielectric plate;
- a plurality of radiators, each of the plurality of radiators being disposed on and extending on a horizontal plane spaced apart from a first surface of the dielectric plate;
- a first feeding part disposed on the first surface of the dielectric plate;
- second feeding parts spaced apart from the first feeding part, each of the second feeding parts having a plate shape; and
- a metal plate disposed on a second surface of the dielectric plate opposite to the first surface of the dielectric plate,
- wherein each of the second feeding parts is positioned between the first feeding part and a corresponding radiator of the plurality of radiators,
- wherein a portion of the first feeding part is overlapped with each of the second feeding parts and the corresponding radiator of the plurality of radiators in a direction perpendicular to the horizontal plane, and
- wherein the portion of the first feeding part is configured to provide signals to the plurality of radiators via the second feeding parts electrically coupled with the first feeding part.

2. The antenna module of claim 1, wherein the dielectric plate includes protrusions extended from a portion of the first surface of the dielectric plate, and
- wherein the plurality of radiators are spaced apart from the first surface of the dielectric plate via the protrusions.

3. The antenna module of claim 1, wherein a length between each of the second feeding parts and the corresponding radiator of the plurality of radiators is determined based on a magnitude of a frequency related to the signals.

4. The antenna module of claim 1, wherein a length between a first end of each of the second feeding parts and a second end of each of the second feeding parts is determined by a predetermined value, and the predetermined value is determined by a wavelength of one signal of the signals or a permittivity of the dielectric plate,
- wherein the second end of each of the second feeding parts is positioned on an opposite side of the first end of each of the second feeding parts, and
- wherein each of the signals is inputted to the second end of each of the second feeding parts.

5. The antenna module of claim 4, wherein each of the second feeding parts is disposed to overlap with a portion of the corresponding radiator of the plurality of radiators, in the direction perpendicular to the horizontal plane.

6. The antenna module of claim 1, wherein the first feeding part and the second feeding parts are formed by using laser direct structuring (LDS).

7. The antenna module of claim 1, wherein the first feeding part includes the portion and another portion overlapped with each of the second feeding parts and the corresponding radiator of the plurality of radiators in the direction,
- wherein the portion of the first feeding part is electrically connected to one end of two ends of each of the second feeding parts,
- wherein the another portion of the first feeding part is electrically connected to another end of the two ends of each of the second feeding parts, and
- wherein the signals include a first polarization signal provided through the one end of the two ends from the portion of the first feeding part to each of the second feeding parts and a second polarization signal provided through the another end of the two ends from the another portion of the first feeding part to each of the second feeding parts.

8. The antenna module of claim 1, wherein the metal plate forms an air gap with the dielectric plate at a position substantially overlapping with the first feeding part and the second feeding parts.

9. The antenna module of claim 1, wherein the dielectric plate forms an air gap between the metal plate and the dielectric plate, at a position substantially overlapping with the first feeding part and the second feeding parts.

10. A base station in a wireless communication system, the base station comprising:
- one or more transmitters;
- one or more receivers; and
- an antenna module associated with the one or more transmitters and the one or more receivers, the antenna module comprising:
  - a dielectric plate;
  - a plurality of radiators, each of the plurality of radiators being disposed on and extending on a horizontal plane spaced apart from a first surface of the dielectric plate;
- a first feeding part disposed on the first surface of the dielectric plate;
  - second feeding parts spaced apart from the first feeding part, each of the second feeding parts having a plate shape; and
  - a metal plate disposed on a second surface of the dielectric plate opposite to the first surface of the dielectric plate,
- wherein each of the second feeding parts is positioned between the first feeding part and a corresponding radiator of the plurality of radiators,
- wherein a portion of the first feeding part is overlapped with each of the second feeding parts and the corresponding radiator of the plurality of radiators in a direction perpendicular to the horizontal plane, and
- wherein the portion of the first feeding part is configured to provide signals to the plurality of radiators via the second feeding parts electrically coupled with the first feeding part.

11. The base station of claim 10, wherein the dielectric plate includes protrusions extended from a portion of the first surface of the dielectric plate, and
- wherein the plurality of radiators are spaced apart from the first surface of the dielectric plate via the protrusions.

12. The base station of claim 10, wherein a length between each of the second feeding parts and the corresponding radiator of the plurality of radiators is determined based on a magnitude of a frequency related to the signals.

13. The base station of claim 10, wherein a length between a first end of each of the second feeding parts and a second end of each of the second feeding parts is determined by a predetermined value, and the predetermined value is determined by a wavelength of one signal of the signals or a permittivity of the dielectric plate, wherein the second end of each of the second feeding parts is positioned on an opposite side of the first end of each of the second feeding parts, and wherein each of the signals is inputted to the second end of each of the second feeding parts.

14. The base station of claim 13, wherein each of the second feeding parts is disposed to overlap with a portion of the corresponding radiator of the plurality of radiators, in the direction perpendicular to the horizontal plane.

15. The base station of claim 10, wherein the first feeding part and the second feeding parts are formed by using laser direct structuring (LDS).

16. The base station of claim 10, wherein the first feeding part includes the portion and another portion overlapped with each of the second feeding parts and the corresponding radiator of the plurality of radiators in the direction, wherein the portion of the first feeding part is electrically connected to one end of two ends of each of the second feeding parts, wherein the another portion of the first feeding part is electrically connected to another end of the two ends of each of the second feeding parts, and wherein the signals include a first polarization signal provided through the one end of the two ends from the portion of the first feeding part to each of the second feeding parts and a second polarization signal provided through the another end of the two ends from the another portion of the first feeding part to each of the second feeding parts.

17. The base station of claim 10, wherein the metal plate forms an air gap with the dielectric plate at a position substantially overlapping with the first feeding part and the second feeding parts.

18. The base station of claim 10, wherein the dielectric plate forms an air gap between the metal plate and the dielectric plate, at a position substantially overlapping with the first feeding part and the second feeding parts.

19. The antenna module of claim 1, wherein each of the second feeding parts is disposed between the portion of the first feeding part and the corresponding radiator of the plurality of radiators, in the direction perpendicular to the horizontal plane.

20. The base station of claim 10, wherein each of the second feeding parts is disposed between the portion of the first feeding part and the corresponding radiator of the plurality of radiators, in the direction perpendicular to the horizontal plane.

* * * * *